United States Patent [19]
Clayton

[11] 3,977,423
[45] Aug. 31, 1976

[54] VALVE CONTROL APPARATUS AND METHOD

[75] Inventor: Hadwen A. Clayton, Bartlesville, Okla.

[73] Assignee: Phillips Petroleum Company, Bartlesville, Okla.

[22] Filed: Mar. 14, 1975

[21] Appl. No.: 558,272

[52] U.S. Cl. .............................. 137/12; 137/487; 137/488; 137/489
[51] Int. Cl.² ........................................ F16K 17/22
[58] Field of Search.............. 137/488, 489.5, 484.2, 137/490, 12, 14, 487, 486, 485, 498, 503, 489; 251/26, 31, 33, 35

[56] References Cited
UNITED STATES PATENTS

| | | | |
|---|---|---|---|
| 2,600,073 | 6/1952 | Plank | 137/487 |
| 3,097,664 | 7/1963 | Henley | 137/487 |
| 3,357,443 | 12/1967 | Brumm | 137/489.5 X |

FOREIGN PATENTS OR APPLICATIONS

| | | | |
|---|---|---|---|
| 1,192,558 | 2/1958 | France | 137/487 |
| 735,363 | 5/1943 | Germany | 137/503 |

*Primary Examiner*—Martin P. Schwadron
*Assistant Examiner*—Robert J. Miller

[57] ABSTRACT

An apparatus and method for controlling a fluid pressure actuated valve are provided whereby the valve inlet pressure and valve outlet pressure are applied to control and limit the valve outlet pressure and to substantially reduce the fluid pressure applied to the valve actuating means when the valve inlet pressure is below a preselected safe value.

10 Claims, 1 Drawing Figure

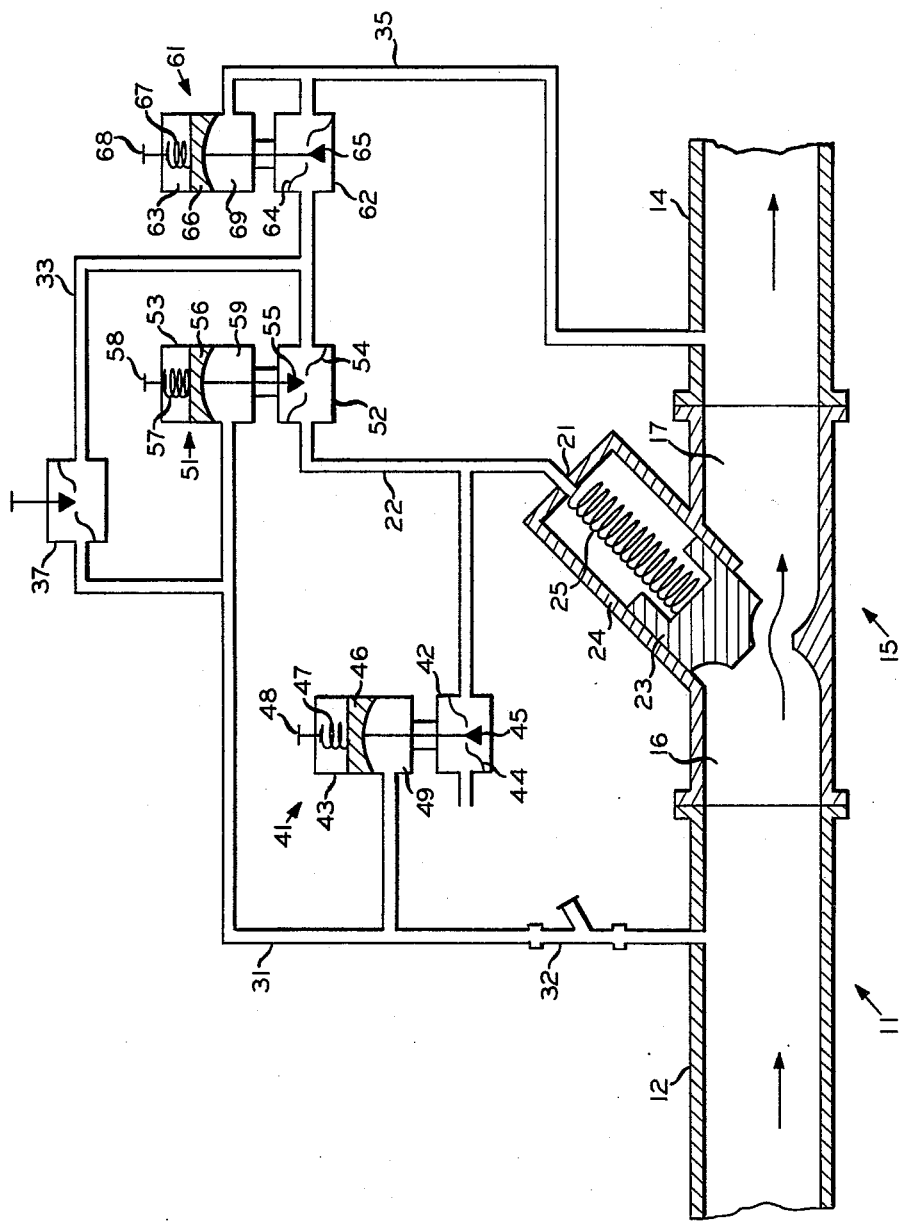

VALVE CONTROL APPARATUS AND METHOD

This invention relates to an apparatus and method for operating a valve means. In another aspect the invention relates to an apparatus and method for controlling the flow of fluid through a main conduit. In still another aspect the invention relates to an improved pressure regulating apparatus and method. In yet another aspect the invention relates to a method and apparatus for controlling the flow of material through a pipeline.

In many applications requiring the use of a pressure regulating valve means, the regulating valve is required to perform its regulating function on only an intermittent basis and is not required during the normal routine operation of the conduit means with which it is associated. For example, in a pipeline, such as a pipeline carrying petrochemical fluids, the construction of the pipeline over hills, down long grades, or in mountainous terrain where the flow of material through certain sections of the pipeline will always be in the downhill direction, it is a common practice to design such descending pipeline portions to withstand the pressures ordinarily associated with normal flow through the pipeline at a substantial saving over the cost of materials required to construct a pipeline capable of withstanding the substantially higher pressures which would result from a static head of fluid material within the pipeline under nonflowing conditions. In such construction the strength of the conduit at the base of a long incline or hill where uphill flow through the pipeline is necessary may need to be substantially stronger, and thus more expensive, than the conduit nearer the top of the hill or incline. In a situation where downhill flow through the pipeline exists, however, the strength of the pipeline conduit at the bottom of a hill or incline does not need to be substantially increased if means can be provided for preventing excessive pressures such as those attendant to the cessation of flow in, for example, a liquid full pipeline. In order to prevent the buildup of such pressures, one or more pressure regulating valves are ordinarily installed in the downward flowing portions of such a pipeline to prevent the buildup of downstream pressure above a safe level.

The pressure regulating valves previously utilized in such applications have operating characteristics which, while they permit effective regulating of the flow to maintain downstream pressures below a predetermined maximum safe value, result in a substantial pressure drop across the valve even when regulation of the downstream pressure is not required. For example, a typical pressure regulating valve which is adapted to close as far as necessary in order to create a pressure drop sufficient to maintain the pressure downstream from the valve below 600 psig ($4.14 \times 10^6$ Pascals) may also, because of its inherent operating characteristics, provide a minimum pressure drop of 10 to 20 psi ($6.89 \times 10^4$ to $1.38 \times 10^5$ Pascals) even though the upstream pressure is well below the maximum downstream pressure and no regulation is required. In an application such as a products pipeline, the presence of such pilot operated regulating valves, while advantageous in terms of reduced pipeline construction costs and protection against unwanted pressure buildup during infrequent flow disruptions, has the disadvantage of causing a continuing pumping horsepower loss due to the minimum pressure drop across each such valve during normal operation of the pipeline. In a typical pipeline installation the pressure regulating valves may be required to operate less than 1 percent of the time. In addition to product pipelines, other similar applications requiring only intermittent pressure regulation share the same problem.

It is therefore an object of this invention to provide an apparatus and method for controlling the operation of a valve means. Another object of the invention is to provide an apparatus and method for controlling the flow of fluid through a main conduit. Yet another object of the invention is to provide an improved pressure regulating apparatus and method. Still another object of the invention is to provide a method and apparatus for controlling the flow of material through a pipeline. An additional object of the invention is to provide an apparatus and method for avoiding unnecessary or excessive pressure loss resulting from the presence of a regulating valve in a conduit.

In accordance with the invention an apparatus and method are provided whereby the fluid pressure applied to the pressure actuating means of a pilot controlled valve is substantially reduced when the upstream pressure at the valve inlet is low enough to insure a safe downstream pressure at the valve outlet without pressure regulation by the valve. When the upstream pressure increases and pressure regulation by the valve is required, such regulation is automatically provided by a plurality of pilot valves which apply the required pressure to the actuating mechanism of the pilot controlled valve. Use of the apparatus and method of the invention in conjunction with the operation of a pressure regulating valve can reduce the pressure drop across the valve to an insignificant amount when pressure regulation by the valve is not required. The apparatus of the invention can be constructed from commercially available materials and components. In addition, the apparatus and method of the invention can be adapted to utilize the fluid pressure at the inlet and outlet of a valve as the only source of power in their operation.

Other objects and advantages of the invention will be apparent from the specification and from the appended claims thereto as well as from the description of the drawing in which the sole FIGURE is a schematic cross-sectional view of a valve means employing the apparatus and method of the invention.

Referring now to the drawing, there is illustrated a pipeline 11 having an upstream portion 12 and a downstream portion 14. A pilot operated valve means 15 is interposed between the upstream portion 12 and the downstream portion 14 of the pipeline 11 for providing regulation of fluid flow through the pipeline. The valve means 15 has an upstream inlet portion 16 in fluid communication with the upstream portion 12 of the pipeline 11 and a downstream outlet portion 17 in fluid communication with the downstream portion 14 of the pipeline 11. A pilot pressure inlet means 21 provides fluid communication with the actuating mechanism of the valve 15. In the preferred valve means illustrated, a piston 23 is movably positioned within a mating housing 24. The pressure at the pilot pressure inlet 21 is applied through an opening in the piston housing 24 to the back side of the piston 23 to exert a force on the piston 23 which tends to move the piston 23 into the flow of material through the valve 15, thereby regulating or preventing the flow of material through the valve 15. A spring means 25 or other similar means for applying a continuous mechanical force to the back side of the piston 23 can be utilized to exert a force on the piston 23 which cooperates with the force exerted by the pressure applied to the pilot pressure inlet means 21. The piston 23 and its mating housing 24 are positioned so that the forces on the back side of the piston 23 are opposed by the pressure of material within the upstream inlet 16 of the valve 15 and the upstream portion 12 of the conduit 11. Although the operation of the invention will be described in conjunction with the illustrated piston valve, the apparatus and method of the invention can be readily adapted by those skilled in the art to control the operation of any suitable valve having a pilot pressure inlet means 21 for applying a fluid pressure to close the valve.

A conduit means 31 communicates with the upstream portion 12 of the main conduit 11 to provide a fluid pressure signal or fluid pressure level in response to the fluid pressure within the upstream portion 12 of the main conduit 11 and the upstream inlet portion 16 of the valve 15. The conduit means 31 can be made up of a plurality of individual conduits as necessary to provide adequate and appropriate communication with apparatus to be served thereby. A strainer 32 or other similar filter means as known in the art can be located within the conduit means 31 as a portion thereof. The purpose of such a strainer 32 is to prevent the passage of particulate matter which might interfere with the operation of the conduit means 31 or the equipment served thereby. In appropriate applications where the entry of particulate matter into the conduit means 31 is not a problem, the strainer 32 can be omitted.

A second conduit means 35 provides fluid communication therethrough with the downstream portion 14 of the main conduit 11 and the downstream outlet portion 17 of the valve 15. The conduit means 35, which may be made up of a plurality of individual conduits, is therefore capable of providing a fluid pressure signal or fluid pressure level responsive to the fluid pressure within the main conduit 11 downstream of the valve 15.

Although the conduits 31 and 35 have been illustrated in communication with the main conduit 11 at the upstream portion 12 immediately upstream of the valve 15 and at the downstream portion 14 immediately downstream from the valve 15 respectively, in many applications it may be desirable for the conduits 31 and 35 to communicate directly with the respective upstream portion 16 and the downstream portion 17 of the valve 15. When such communication is directly with the valve 15, the valve 15 and its associated control equipment can be provided as a single unit for insertion into a conduit 11.

The illustrated preferred embodiment of the invention utilizes a flow restriction valve 37 and three pilot valves 41, 51, 61 to provide a suitable pressure signal or pressure value to the pilot pressure inlet means 21 of the valve 15. Each pilot pressure valve 41, 51, 61 has associated therewith a respective valve means 42, 52, 62, and actuating means 43, 53, 63. The interior of each valve means 42, 52, 62 respectively contains a partition 44, 54, 64 having an opening therethrough and a closure mechanism 45, 55, 65 adapted to be seated within or against its associated partition 44, 54, 64 to prevent fluid communication through the respective valve means 42, 52, 62.

Each actuating means 43, 53, 63 comprises a respective housing having a piston 46, 56, 66; a spring means 47, 57, 67; a set point adjustment means 48, 58, 68 and a pressure signal chamber 49, 59, 69. Each piston 46, 56, 66 is mechanically linked to the closure mechanism 45, 55, 65 of its respective pilot valve 41, 51, 61.

The force applied to the piston 46, 56, 66 of each actuating mechanism 43, 53, 63 by its associated spring means 47, 57, 67 and the opposing force resulting from the application of fluid pressure to the respective pressure chamber 49, 59, 69 determine the position of each piston 46, 56, 66 within the actuating mechanism. The set point adjustment means 48, 58, 68 can be utilized to adjust the amount of fluid pressure within the pressure chamber of the associated actuating means required to open or close the closure mechanism 45, 55, 65 linked to each piston 46, 56, 66. Pilot valves 41 and 61 are of the type ordinarily designated as "normally open," and pilot valve 51 is of the type normally designated as "normally closed." The application of sufficient fluid pressure to the pressure chambers 49 and 69 will tend to move the associated closure mechanisms 45 and 65 to a closed position in which they are seated against or within the opening in the partitions 44 and 64. Application of sufficient pressure to the pressure chamber 59 will tend to move the associated closure mechanism 55 to a more open position, permitting freer fluid communication through the opening in the partition 54.

The flow restriction valve 37 permits limited fluid communication between the conduit means 31 and a conduit means 33 and can be adjusted to change the sensitivity of the action of the pilot valve 61 on the pressure within the conduit 33. The flow restriction provided by the flow restriction valve 37 is preferably such that when the valve means 62 associated with the pilot valve 61 is in its open position, permitting essentially free fluid communication between the conduit means 35 and the conduit means 33, the flow of fluid from the conduit means 31 through the restriction valve 37 to the conduit means 33 will not be sufficient to raise the fluid pressure within the conduit means 33 above that within the conduit means 35. In addition, the flow restriction provided by the restriction valve 37 should be such that the desired relationship among the pressures within the conduit means 31, the conduit means 33, and the conduit means 35 is maintained when the valve means 62 associated with the pilot valve 61 is in a partially closed position. It is necessary that the restriction valve 37 permit enough flow therethrough to equalize the pressure between the conduit means 31 and the conduit means 33 upon closure of the valve means 62 associated with the pilot valve 61.

The valve means 52 associated with the pilot valve 51 controls fluid communication between the conduit means 33 and a conduit means 22. The conduit means 22 is in fluid communication with the pilot pressure inlet means 21 for providing a pilot pressure signal to the pilot controlled valve 15. When the valve means 52 is in its open position, the fluid pressure within the conduit means 22 will be the same as the fluid pressure within the conduit means 33.

The valve means 42 associated with the pilot valve 41 connects the conduit means 22 with a source of relatively low pressure. In the preferred embodiment illustrated wherein both the upstream portion 12 and the downstream portion 14 of the main conduit 11 are ordinarily pressurized above atmospheric pressure during all stages of operation of the system, a suitable source of relatively low pressure is the ambient atmospheric pressure. In systems which can be expected to operate normally at a pressure near or below normal atmospheric pressure, the valve means 42 would connect the conduit means 22 with a suitable source of vacuum or other pressure source having a pressure substantially less than the normal operating pressure within either the upstream portion 12 or the downstream portion 14 of the conduit 11. In the embodiment illustrated, opening of the valve means 42 associated with the pilot valve 41 reduces the fluid pressure within the conduit means 22 to ambient atmospheric pressure.

The conduit means 31 is in fluid communication with the pressure chambers 49 and 59 of the pilot valves 41 and 51, and the conduit means 35 is in fluid communication with the pressure chamber 69 of the pilot valve 61. In accordance with the invention the set point adjusting means 68 associated with the pilot valve 61 is adjusted so that the fluid pressure required within the pressure chamber 69 to close the valve means 62 is the pressure provided to the pressure chamber 69 by the conduit means 35 when the pressure within the downstream outlet portion 17 of the valve 15 and the downstream portion 14 of the conduit 11 is equal to a preselected safe maximum pressure. The set point similarly provided for the pilot valve 51 by adjustment of the set point establishing means 58 will be chosen so that the valve means 52 will remain at least partially open when the pressure provided to the pressure chamber 59 by the conduit means 31 is responsive to a pressure within the upstream portion 12 of the conduit 11 and the upstream inlet portion 16 of the valve 15 in excess of a preselected safe upstream pressure at which the system can be operated without pressure regulation. The set point adjustment means 48 associated with pilot valve 41 is adjusted so that the valve means 42 is at least partially open whenever the pressure applied to the pressure chamber 49 is less than a preselected upstream pressure at which the system can be safely operated without pressure regulation. The set points of the pilot valves 41, 51, 61 are therefore adjusted so that the pressure required to close the valve means 42 of the pilot valve 41 is less than the pressure required to open the valve means 52 of the pilot valve 51 which in turn is less than the pressure required to close the valve means 62 of the pilot valve 61. Although the pressure at which the valve means 42 begins to open and the pressure at which the valve means 52 is fully closed could theoretically be the same pressure, as a practical matter it is necessary to insure that either the valve means 42 or the valve means 52 will be fully closed at all times in order to prevent unnecessary loss of fluid from the conduit 11 through the valve means 42. The most advantageous use of the apparatus and method of the invention is ordinarily obtained when the pressure within the upstream portion 12 of the conduit 11 is less than the upstream pressure at which the conduit 31 will provide a pressure to the pressure chamber 49 sufficient to close the valve means 42.

The pressure required to open the valve means 52 associated with the pilot valve 51 will ordinarily be slightly greater than the pressure required to close the valve means 42 associated with the pilot valve 41. The pressure within the conduit means 31 necessary to open the valve means 52 associated with the pilot valve 51 is preferably substantially less than the pressure within the conduit means 35 required to close the valve means 62 associated with the pilot valve 61 so that a suitable pressure range is provided over which regulation of the downstream pressure by the valve 15 will be accomplished. The amount by which the pressure required to close the pilot valve 61 exceeds the pressure required to open the pilot valve 51 will, of course, depend on the amount by which the maximum safe pressure in the downstream portion 14 of the conduit 11 exceeds the maximum normal operating pressure range which can be expected within the upstream portion 12 of the conduit 11.

In normal operation of the pipeline, the fluid pressure applied to the pressure chambers 49 and 59 of the pilot valves 41 and 51 by the conduit means 31 in response to the pressure at the upstream inlet portion 16 of the valve 15 will be insufficient to either close the valve means 42 or open the valve means 52. When the valve means 42 is thus in its open position, the pressure applied to the pilot pressure inlet means 21 by the conduit means 22 will be a pressure substantially lower than the pressure within the conduit 11, atmospheric pressure in the preferred embodiment illustrated, and the only closing force exerted on the valve 15 will be the combined force of the spring means 25 and the atmospheric pressure applied to the back side of the piston 23. This closing force is easily overcome by the fluid pressure at the upstream inlet portion 16 of the valve 15 to fully open the valve 15 by compressing the spring means 25 and moving the piston 23 to a position in which it does not present substantial interference with the flow of fluid through the valve 15 and to thereby provide a minimal and, in most cases, insignificant pressure drop between the upstream inlet portion 16 and the downstream outlet portion 17 of the valve 15. In a typical petrochemical pipeline application, for example, the pressure required to compress the spring 25 would ordinarily be the equivalent of 10–20 psi ($6.89 \times 10^4 - 1.38 \times 10^5$ Pascals) or less, thereby creating a pressure of 10–20 psi ($6.89 \times 10^4 - 1.38 \times 10^5$ Pascals), plus the pressure provided from the low pressure source through the valve means 42, on the back side of the piston 23 when the valve 42 is in its open position, and the pressure of the fluid applied to the front of the piston would ordinarily be at least 2 times greater and as much as or more than 10 times greater. This is in contrast to prior art systems utilizing a pressure signal equivalent to that provided by the conduit means 33 as an input to the pilot pressure inlet means 21. In such an arrangement where a minimum pressure substantially equal to the pressure at the downstream outlet portion 17 of the valve 15 is applied to the pilot pressure inlet means 21, even while the valve 15 is in its open position, the pressure drop across the valve 15 will always be at least equal to the equivalent pressure resulting from the exertion of force on the back of the piston 23 by the spring 25. It is therefore readily seen that the pressure drop across the valve 15 during operation in accordance with the present invention is insignificant compared to the minimum pressure drop which would be experienced utilizing the conduit means 33 to provide a fluid pressure signal to the pilot pressure inlet means 21. Use of the method and apparatus of the invention can, depending on the construction of the valve 15, result in a pressure drop across the valve 15 which is not substantially greater than the pressure drop through a similar length of the conduit 11 at normal operating pressures within the pipeline.

In accordance with the invention, an increase in the pressure in the upstream portion 12 of the main conduit 11 above the normal operating level of the pipeline to a predetermined pressure level will cause compression of the spring 47 within the actuating means 43 and will cause the valve means 42 associated with the pilot valve 41 to close. The pressure within the conduit means 22 will remain at the ambient pressure previously applied through the valve means 42 if the upstream pressure provided by the conduit means 31 neither increases nor decreases from this level. If the upstream pressure applied to the conduit means 31 continues to increase, however, compression of the spring 57 in the actuating means 53 will cause the valve means 52 associated with the pilot valve 51 to open. As the valve means 52 begins to open with increasing upstream pressure, the pressure within the conduit 22 will be increased to the pressure within the conduit 33. If the pressure in the pipeline does not thereafter increase or decrease, the combination of the flow restriction valve 37 and the valve 62, which is still in its fully open position, will provide a pressure to the conduit 33 which is substantially the same as the pressure within the conduit 35. Operation of the apparatus of the invention in this mode will result in a pressure drop across the valve 15 in the same manner that a pressure drop would be caused by operation of the valve 15 utilizing the conduit means 33 as an input to the pilot pressure inlet means 21.

If the pressure within the upstream portion 12 of the main conduit 11 continues to increase, the pressure in the downstream portion 14 thereof will also increase. As the downstream pressure, reflected by the pressure within the conduit means 35, continues to increase, the compression of the spring 67 within the actuating means 63 of the pilot valve 61 causes the valve means 62 associated therewith to begin to close. As the restriction between the conduit means 33 and the conduit means 35 provided by the valve means 62 becomes nearer in size to the restriction provided by the restriction valve 37 and/or the upstream pressure is further increased, the pressure within the conduit means 33 begins to build to a value between the fluid pressure within the conduit means 31 and the pressure within the fluid conduit means 35, thereby exerting an increasing closing force on the back of the piston 23. In this manner, the downstream pressure is regulated to prevent an unsafe pressure buildup. If the pipeline pressure continues to increase, the valve means 62 of the pilot valve 61 will close as far as necessary to prevent the downstream pressure from exceeding the desired maximum value. As the valve means 62 is more completely closed, the pressure within the conduit means 33 and the conduit means 22 become substantially equal to the pressure within the conduit means 31 which, in turn, is substantially equal to the pressure within the upstream inlet portion 16 of the valve 15. With approximately equal fluid pressures on the front and the back of the piston 23 in this condition, the spring 25 causes the valve 15 to close completely and prevent further fluid pressure buildup in the downstream portion 14 of the conduit 11.

As the pressure within the downstream portion 14 of the conduit 11 begins to decrease, the valve means 62 continues to vary the degree of fluid communication between the conduit means 35 and the conduit means 33 to provide conventional regulation of the valve 15. As the pressure within the conduit 11 is further decreased approaching the normal operating pressure of the system, the decrease in upstream pressure transmitted by the conduit means 31 to the pilot valve 51 causes the valve means 52 to close. The closure of the valve means 52 will maintain the pressure within the conduit means 22 at the pressure which was present within the conduit means 33 when the valve means 52 closed until the valve means 52 reopens or until the pressure within the upstream portion 12 of the main conduit 11 drops to a level low enough to permit the valve means 42 associated with the pilot valve 41 to open. As a further decrease in the pressure within the upstream portion 12 of the main conduit 11 permits the valve means 42 to open, the pressure within the conduit means 22 will be reduced to the pressure level of the pressure source to which the conduit means 22 is connected by the valve means 42. The low pressure thus present within the conduit means 22 will permit operation of the valve 15 with only a slight pressure drop between the upstream inlet portion 16 and the downstream outlet portion 17 thereof until the pressure within the upstream portion 12 of the main conduit 11 increases to a value at which downstream pressure regulation is again desirable.

EXAMPLE

The apparatus of the invention was installed to control a Rockwell-Brodie Model 750 piston type pilot operated pressure reducing regulator valve operating in a 6-inch petroleum products pipeline carrying products ranging from diesel oil to propane, with a specific gravity of from about 0.5 to about 0.8, at a normal flow rate of 1,342 gallons per minute where the inlet pressure to the valve during normal flow conditions was generally within the range of from about 50 to about 250 psig (about $3.45 \times 10^5$ to about $1.72 \times 10^6$ Pascals). The maximum inlet pressure which was to be permitted in the upstream pipeline adjacent the valve was 1,440 psig ($9.93 \times 10^6$ Pascals), and the maximum pressure permitted downstream of the valve to maintain acceptable downstream pressure limits was 600 psig ($4.14 \times 10^6$ Pascals).

The flow restriction valve 37 was a variable orifice needle valve. Each of the pilot valves 41, 51, 61 was a Rockwell-Brodie Model 2750 piston actuated steel pilot valve equipped with O-ring seals. The first pilot valve 41 was a normally open valve equipped with a snap piston for closing when the pressure applied to the piston thereof reached its 475 psig ($3.28 \times 10^6$ Pascals) set point. The second pilot valve 51 was a normally closed valve equipped with a snap piston for opening the valve when the pressure on the piston thereof reached its 500 psig ($3.45 \times 10^6$ Pascals) set point. The third pilot valve 61 was equipped with a modulating piston for varying the valve opening to maintain a downstream pressure at or below its 600 psig ($4.14 \times 10^6$ Pascals) set pressure. The strainer 32 utilized was a steel body Y strainer with a fine mesh screen.

All apparatus was connected as illustrated in the drawing. At upstream valve pressures in excess of 500 psig, ($3.45 \times 10^6$ Pascals), the third modulating piston pilot valve maintained the valve downstream pressure below 600 psig ($4.14 \times 10^6$ Pascals) with at least a 10–20 psi ($6.89 \times 10^4 - 1.38 \times 10^5$ Pascals) pressure drop across the valve 15. At normal upstream pipeline operating pressures, below 475 psig, ($3.28 \times 10^6$ Pascals) the pilot pressure was released from the pilot operated valve 15 and the pressure drop across the valve during normal operation of the pipeline was negligible.

Although the apparatus and method of the invention have been described in conjunction with a preferred embodiment thereof, reasonable modifications and variations can be made by those skilled in the art without departing from the scope of the invention or the appended claims thereto.

What is claimed is:

1. Apparatus for controlling the flow of fluid through a main conduit means, said apparatus comprising:
   a valve means for controlling flow through said main conduit, said valve means comprising
      an upstream inlet portion,
      a downstream outlet portion,
      a valve element adapted to vary the restriction to flow from said upstream inlet portion to said downstream outlet portion, and
      pilot pressure inlet means for applying fluid pressure to said valve element to exert a closing force on said valve element;
   first conduit means, in fluid communication with said upstream inlet portion of said valve means, for providing a source of fluid pressure responsive to the fluid pressure within said upstream inlet portion;
   second conduit means, in fluid communication with said downstream outlet portion of said valve means, for providing a source of fluid pressure responsive to the fluid pressure within said downstream outlet portion;
   flow restriction means for providing a predetermined degree of communication between said first conduit means and a third conduit means;
   first pilot valve means for controlling fluid communication between said second conduit means and said third conduit means in response to the fluid pressure within said second conduit means;
   second pilot valve means for controlling fluid communication between said third conduit means and said pilot pressure inlet means in response to the fluid pressure within said first conduit means; and
   third pilot valve means for controlling fluid communication between said pilot pressure inlet means and a low fluid pressure source in response to the fluid pressure within said first conduit means, said low fluid pressure source having a fluid pressure which is less than the fluid pressure within said second conduit means.

2. Apparatus in accordance with claim 1 wherein said valve element is positioned in said valve means so that the fluid pressure of a fluid within said upstream inlet portion exerts an opening force on said valve element; said apparatus further comprising means for applying a mechanical force to said valve element in opposition to said opening force to exert a closing force on said valve element; and wherein said pilot pressure inlet means for applying fluid pressure to exert a closing force on said valve element comprises means for augmenting the force applied by said means for applying a mechanical force.

3. Apparatus in accordance with claim 1 wherein said first pilot valve means comprises means for preventing fluid communication between said second conduit means and said third conduit means when the fluid pressure within said second conduit means exceeds a predetermined first pressure level.

4. Apparatus in accordance with claim 3 wherein said second pilot valve means comprises means for preventing fluid communication between said third conduit means and said pilot pressure inlet means when the fluid pressure within said first conduit means is below a predetermined second fluid pressure level, said second fluid pressure level being less than said first fluid pressure level.

5. Apparatus in accordance with claim 4 wherein said third pilot valve means comprises means for preventing fluid communication between said pilot pressure inlet means and said low fluid pressure source when the fluid pressure within said first conduit means exceeds a preselected third fluid pressure level, said third fluid pressure level being less than said second fluid pressure level.

6. Apparatus in accordance with claim 5 wherein said low fluid pressure source comprises am ambient atmospheric pressure source.

7. Apparatus in accordance with claim 6 wherein said valve element is positioned in said valve means so that the fluid pressure of a fluid within said upstream inlet portion exerts an opening force on said valve element; said apparatus further comprising means for applying a mechanical force to said valve element in opposition to said opening force to exert a closing force on said valve element; and wherein said pilot pressure inlet means for applying fluid pressure to exert a closing force on said valve element comprises means for augmenting the force applied by said means for applying a mechanical force.

8. A method for operating a valve means having an upstream inlet, a downstream outlet, and a fluid-actuated closure mechanism associated therewith to control the flow of fluid through said valve means, said method comprising:
   establishing a first fluid pressure signal responsive to the fluid pressure within said upstream inlet of said valve means;
   establishing a second fluid pressure signal responsive to the fluid pressure within said downstream outlet of said valve means;
   automatically applying said first fluid pressure signal to said closure mechanism when said second fluid pressure signal exceeds a preselected first pressure value;
   automatically applying said second fluid pressure signal to said closure mechanism when said first fluid pressure signal is within a preselected range between said first pressure value and a preselected second pressure value, said second pressure value being lower than said first pressure value; and
   automatically reducing the pressure applied to said closure mechanism to a value lower than said second fluid pressure signal when said first fluid pressure signal is lower than a preselected third pressure value, said third pressure value being lower than said second pressure value.

9. A method in accordance with claim 8 additionally comprising maintaining the pressure applied to said closure mechanism at its previous value when said first fluid pressure signal is between said third pressure value and said second pressure value.

10. A method in accordance with claim 9 additionally comprising:
   applying a continuous mechanical force to said closure mechanism, said mechanical force being applied to assist in closing said closure mechanism; and
   applying the fluid pressure within said main conduit immediately upstream of said valve means to resist closure of said closure mechanism.

* * * * *